2,854,369

INCREASING THE SOLUBILITY OF METAL ACCELERATORS IN PHOSPHATIZING SOLUTIONS

Max Kronstein, New York, N. Y., assignor to Oakite Products, Inc., a corporation of New York No Drawing. Application October 4, 1957
Serial No. 688,122

7 Claims. (Cl. 148—6.15)

The invention relates to phosphate coating materials and to processes for using the same.

The primary object of the invention is to increase the efficiency of phosphate coating compositions.

It has been known in the art that the coating action of phosphatizing solutions in contact with metal surfaces can be influenced and promoted by the incorporation in the solutions of metal ions other than those of the metals which are to be treated. In particular, the incorporation of small amounts of vanadic acid, tungstic acid, molybdic acid or their anhydrides or salts has been suggested.

It has been found desirable to increase the concentration of these materials in the phosphatizing solutions, since this increases the efficiency of the solutions.

The concentrations of such metal compounds heretofore used in the art was very low, because of the very limited water solubility of these metal accelerators.

Lange's Handbook of Chemistry, VIII edition, lists vanadic acid (meta- and pyro-) as water insoluble, and gives for vanadium pentoxide a solubility of 0.07 part in 100 parts water at 25° C. as well as at 100° C.

Tungstic acid is listed as insoluble in cold water and slightly soluble in hot water. Tungsten di- or tri-oxides are listed as insoluble in cold and in hot water. Molybdic acid is listed as very slightly soluble in cold water and slightly soluble in hot water. Its hydrated form is said to be soluble to the extent of 0.13333 part in 100 parts of water at 18° C. and 2.13 parts in 100 parts of water at 70° C. The molybdenum di- and sesqui-oxides are insoluble in cold and in hot water, and the molybdenum trioxide is at 18° C. soluble to the extent of 0.107 part per 100 parts water or at 79° C. to the extent of 2.106 parts in 100 parts of water.

These metal accelerator materials are, at least under the practical storage and shipping temperatures and conditions for phosphatizing solutions, insufficiently soluble.

It is an object of the invention to increase the solubility of these components so as to increase their effectiveness in phosphatizing solutions.

It is a further object of the invention not only to incorporate these components in the phosphatizing compounds, but also to make it possible to maintain them there in a satisfactory concentration under such temperature and other conditions as must be met in practice. That is, they must remain soluble not only under the hot spray application conditions, but also under the conditions of shipping and storage at room temperature.

I have found that this aim can be accomplished by dispersing these metal accelerators in formamide

preferably with the application of heat, and by then making this dispersion or solution a part of a water solution or of a water-diluted phosphatizing composition.

Instead of formamide as a solubilizing agent, derivatives of formamide, in which one or both of the hydrogens in the —$NH_2$ groups have been replaced by other radicals, and especially the alkyl-substituted formamides such as methyl formamide may be used in substantially the same proportions. Those compounds are preferred which are liquid below 100° C., and which leave behind no harmful residues when the coating is rinsed in the conventional manner and then heated to dryness. Formamide is especially useful in this respect since all its elements are volatile and are driven off when the coating is heated.

This dispersion in formamide or its compounds can be made in the presence of other organic components suitable for incorporation in phosphatizing solutions. In my application entitled "Metal Phosphatizing," Serial No. 499,749, filed April 6, 1955, it has been shown that formamide is an agent which can also be used for increasing the solubility or organic accelerators, especially certain unsaturated alcohols, in the formation of phosphate coatings. It is possible to use the solutions of such organic accelerators in formamide for the dispersion of the metal accelerators. It is also possible to increase the solubility of the organic accelerators by the use of the dispersions of the metal accelerators in formamide. Afterwards the reaction mixtures can be added to water and mixed with phosphatizing solutions or they can be added to the metal phosphatizing solutions directly.

Two different metal accelerators of the group disclosed above can be dispersed separately or simultaneously, and this dispersion can be added to phosphatizing solutions.

The dispersion of the metal accelerators in formamide can be used as is, or the clearly dissolved part, that is the part which is in clear solution, can be separated, and this part only can be introduced in the phosphatizing compound.

The effect of such treatment of the metal accelerators with formamide on the metal concentrations in the resulting water solution is shown by the following examples:

*Example 1*

An attempt was made to dissolve a considerable amount of tungsten trioxide ($WO_3$) in water. The amount of tungsten trioxide used corresponded to 8.8 grams of tungsten per liter of water. The resulting solution was analyzed by a colorimetric method as listed in Snell, "Colorimetric Methods of Analysis," III edition, page 466. Only 0.012 gram of tungsten was found in one liter of the solution. All measurements were made at room temperature.

10 grams of tungstic trioxide were dispersed with application of heat into 20 grams of formamide, and this dispersion was used instead of the unmodified material in an attempt to introduce an increased amount of tungsten into a solution, using in the test again initially a surplus of tungsten, amounting to 8.8 grams of tungsten per liter of water. Again the resulting tungsten concentration was determined at room temperature by the same method of colorimetric analysis. The new solution contained 0.12 gram of tungsten per liter, or ten times the concentration which had been obtained without the formamide.

*Example 2*

A surplus of tungstic acid ($H_2WO_4$) was used and it was determined how much tungsten can be brought in solution, starting out with an amount of tungstic acid corresponding to 8.2 grams of tungsten to 1 liter of water. Colorimetric analysis found only 0.92 gram of tungsten per liter in solution.

Following the procedure using formamide, in the same manner as described in Example 1, but using tungstic acid instead of tungsten trioxide, a solution was obtained whose tungsten concentration amounted (in the same colorimetric analysis) to 5.0 grams of tungsten per liter of solution.

This was about five times the concentration obtained without the use of formamide. This represents a concentration range wide enough for increased practical efficiency in the application of the metal accelerators in phosphatizing compounds.

The following examples show the preparation of phosphatizing solutions embodying the invention:

Example 3

3.4 grams of tungstic acid are dispersed in 10.2 grams of formamide at around 60° C. 6.8 grams of organic matter such as glucose or corn sugar are added, and the mixture is added to a solution of 153 grams of monosodium orthophosphate and 6 grams of wetting agent (Tween 20) (see "Condensed Chemical Dictionary," fourth edition, 1950, page 681) in 2 quarts of water. The solution is diluted to 4 gallons and is applied as a phosphatizing solution.

Example 4

153 grams of sodium orthophosphate and 6 grams of a wetting agent (Triton X–45) (see "Condensed Chemical Dictionary," fourth edition, 1950, page 677) are dissolved in three quarts of water. The mixture of 3.4 grams of molybdic acid, 5.0 grams of formamide and 6.8 grams of quebracho extract, produced by heating the components below or around the boiling point of the formamide is added. The solution is diluted to 4 gallons and is applied to steel surfaces.

Example 5

The procedure was the same as in Example 4, except that 3.4 grams of tungstic acid are added instead of the molybdic acid.

Example 6

The procedure was the same as in Example 4, except that 3.4 grams of vanadic pentoxide are used instead of the molybdic acid.

Example 7

The procedure was the same as in Example 4, except that a mixture of 2 grams of molybdic acid and 1.4 grams of tungstic acid are added instead of the molybdic acid.

Example 8

The procedure was the same as in Example 3, except that 7.5 grams of molybdic anhydride were dispersed in 25 grams of dimethyl formamide near its boiling point. The resultant solution was decanted from the residue and one part of the solution was diluted with four parts of water. A clear and stable solution was obtained.

Example 9

The procedure was the same as in Example 3, but 10 grams of vanadium pentoxide were dispersed in a mixture of 10 grams of formamide and 20 grams of dimethyl formamide. The resultant solution was decanted from the residue and a clear yellow solution was obtained. 10 grams of this solution were mixed with 30 grams of water and again a clear solution was obtained.

Example 10

The metal accelerator matter was introduced into the compound in the form of salts of the metals. Salts were selected having a higher or lower degree of water solubility in themselves. In either degree of solubility the amount of metal matter which had entered the phosphatizing compound was compared when used without or with formamide or alkylsubstituted formamide. This comparison was made in the following manner:

Petri dishes 3.5 inches in diameter and one-half inch high were filled with a phosphatizing solution consisting of 230 grams of monosodium phosphate anhydrous, 9 grams of wetting agent (Tween 20) and 14 grams of dextrose in a total volume of 1000 ml. of water solution. This solution was used as a comparative material.

Then solutions of various metal salts were prepared in the same kind of phosphatizing solution, without and with the use of formamide or its derivatives. Each of these solutions was prepared by dissolving 2.5 grams of a metal salt in 15 cc. of water without formamide (or its derivatives) or with 30 milliliters of formamide (or its derivatives) and by filling each vessel up to the same level.

Then each of the test dishes was set over the white section of a Morest 07 F Standard Chart and its reflection was measured by the use of the Reflectometer (Photovolt Model 610). The following salts were used:

Calcium tungstate   Cobalt molybdate
Sodium tungstate    Ferrous vanadate
Zinc tungstate      Magnesium metavanadate
Potassium molybdate The dish with the plain phosphatizing solution showed a reflectance of the white base through the solution measured as 35.5 units. With the increasing amount of metal salt dissolved this reflectance was decreased. The following readings were made:

|  | Reflectance Over White With Metal Salt | |
|---|---|---|
|  | Without Formamide | With Formamide |
|  | Units | Units |
| Phosphatizing solution alone | 35.5 | |
| With calcium tungstate | 35.0 | 31.0 |
| With sodium tungstate | 35.5 | 31.0 |
| With zinc tungstate | 35.5 | 32.0 |
| With potassium molybdate | 30.5 | 30.0 |
| With cobalt molybdate | 24.0 | 17.0 |
| With ferrous vanadate | 21.0 | 17.0 |
| With magnesium metavanadate | 19.5 | 10.0 |

The data show that the least soluble salts show the greatest decrease in reflectance by the formamide application, due to the greater increase in metal content obtained in the solution with formamide.

Example 11

Another form of comparison between the solutions without and with formamide was obtained by dissolving 2.5 grams of each salt either in 50 milliliters of distilled water or in 20 milliliters of distilled water and 30 milliliters of formamide. The mixtures were heated to boiling, filtered into a large test tube and 50 milliliters of the same phosphatizing solution was added as described in Example 10. Part of this solution was centrifuged for 1 minute and the obtained solutions were compared in respect to their light transmission.

Again an increased amount of the metal salt in the solution caused a decrease in the light transmission of the solution.

The readings were made with a colorimeter (Photovolt Lumetron Model 402–E). The results show again the influence of the use of formamide on the transmission-decreasing amount of salts entering the solution:

| Metal Salt Dissolved | Filter Used | Reduction Plate No. | Without Formamide | With Formamide |
|---|---|---|---|---|
| Calcium tungstate | M 390 | 8 and 9 | 97.4 | 90.7 |
| Sodium tungstate | M 390 | 8 and 9 | 96.4 | 94.7 |
| Potassium molybdate | M 390 | 8 and 9 | 88.1 | 83.4 |
| Cobalt molybdate | M 390 | 8 and 9 | 95.2 | 91.6 |
| Ferrous vanadate | M 390 | 8 and 9 | 87.4 | 73.5 |
| Magnesium metavanadate | M 640 and M 620 | 8 and 9 | 46.7 | 8.5 |

All measurements were made at a sensitivity setting of 15:10, and they again showed that the formamide application increased the entering of the metal accelerator matter into the phosphatizing solution.

*Example 12*

Six steel panels each (1010 steel) were pressure sprayed with a solution of 230 grams of monosodium phosphate anhydrous, 9 grams of wetting agent (Tween 20), 14 grams of dextrose and 2.5 grams of magnesium metavanadate in 1 gallon water solution. In one group this metal salt was introduced without a formamide, in the second group the salt was dispersed in 100 milliliters of dimethyl formamide and was added to the solution. In both groups the solution was finally further diluted to 4 gallons by the addition of water.

Then the panels were pressure sprayed, rinsed and dried. All the obtained surface coatings were dissolved again in a solution of 300 milliliters of formaline (36.5%) and 600 milliliters of hydrochloric acid (37.2%). The amount of the dissolved coating represents the amount of "stripped" reaction coating on the steel. This strippable reaction amounted for 123.2975 square inches of surface coated without dimethyl formamide to 0.0402 gram, and for 128.7084 square inches of surface coated with the use of dimethyl formamide it amounted to 0.0474 gram.

In milligrams per square foot the "stripping weight" amounted for the panels without dimethyl formamide to 46.96 milligrams, for the panels prepared with the use of dimethyl formamide it amounted to 53.02 milligrams. This represents an increase of 12.9% in the amount of useful coating.

Steel panels coated with these solutions were compared with panels treated with solutions containing these metal accelerators without formamide. The phosphatized panels were coated with an OD enamel, about 1 mil thick, and other panels were coated with a thick coating of a Gilsonite asphalt—linseed oil test lacquer (about 0.2 to 0.4 mil thick). Some panels were coated with the organic material within 3 minutes after their phosphatizing and chromic acid rinse treatment and the drying procedure. Others were exposed in the laboratory air for three days between this treatment and the application of the organic coating.

The OD enamel coated panels were exposed in the saltfog chamber for 200 hours, the asphalt coated panels for 100 hours.

In then comparing the condition of the steel panels with phosphatized panels without the use of formamide with those prepared in accordance with Example 5, it was found that the solution according to the present invention, with the increased concentration of metal accelerator, decreased the moisture spreading from the test cross in the OD enamel coated series considerably. It also increased the life of the asphalt coating as shown by the maintaining of a greater adhesion of the organic coating to the steel surface. This was determined by pressing a strong photographic paper (Dye transfer paper) in a wet condition under the Carver press against the coated panel surface after 100 hours saltfog exposure. The amount of asphalt coating adhering, after release of the pressure, to the paper instead of to the panel, was considerably smaller in the case of the panels with the increased content of metal accelerator than in the case of the other panels.

This application is a continuation in part of my application Serial No. 499,762, filed April 6, 1955, now abandoned.

While I have described herein some embodiments of my invention, I wish it to be understood that I do not intend to limit myself thereby except within the scope of the claims hereto or hereinafter appended.

I claim:

1. A phosphate coating composition consisting essentially of water and a phosphate in an amount sufficient for coating strength containing an accelerating agent consisting essentially of an effective amount of at least one substance selected from the group consisting of formamide and alkyl-substituted formamides and at least one metal compound selected from the group consisting of vanadic acid, tungstic acid and molybdic acid and their anhydrides and salts, the substance being present in an amount sufficient to solubilize said metal compound.

2. A phosphate coating composition consisting essentially of water and a phosphate in an amount sufficient for coating strength containing an accelerating agent consisting essentially of an effective amount of at least one substance selected from the group consisting of formamide and alkyl-substituted formamides and at least one metal compound selected from the group consisting of vanadic acid, tungstic acid and molybdic acid and their anhydrides and salts in the proportion of at least about 1 part by weight of said substance to 1 part by weight of said metal compound.

3. A phosphate coating composition composed principally of water and a phosphate in an amount sufficient for coating strength and containing an accelerating agent consisting essentially of at least one substance selected from the group consisting of formamide and alkyl-substituted formamides and at least one metal compound selected from the group consisting of vanadic acid, tungstic acid and molybdic acid and their anhydrides and salts, the metal compound being present in a proportion by weight of at least about 1% of the weight of the phosphate, the substance being present in an amount sufficient to solubilize said metal compound.

4. A phosphate coating composition composed principally of water and a phosphate in an amount sufficient for coating strength and containing an accelerating agent consisting essentially of at least one substance selected from the group consisting of formamide and alkyl-substituted formamides and at least one metal compound selected from the group consisting of vanadic acid, tungstic acid and molybdic acid and their anhydrides and salts in the proportion of at least about 1 part by weight of said substance to 1 part by weight of said metal compound, the metal compound being present in a proportion by weight of at least about 1% of the weight of the phosphate.

5. A phosphate coating solution comprising water and an acid phosphate in an amount sufficient for coating strength, and an accelerating agent consisting essentially of at least one substance selected from the group consisting of formamide and alkyl-substituted formamides and at least one metal compound selected from the group consisting of vanadic acid, tungstic acid and molybdic acid and their anhydrides and salts, the metal compound being dissolved to the amount of at least about 3 grams to four gallons of water, the substance being present in an amount sufficient to solubilize said metal compound.

6. A phosphate coating solution comprising water and an acid phosphate in an amount sufficient for coating strength, and an accelerating agent consisting essentially of at least one substance selected from the group consisting of formamide and alkyl-substituted formamides and at least one metal compound selected from the group consisting of vanadic acid, tungstic acid and molybdic acid and their anhydrides and salts, in the proportion of at least about 1 part by weight of said substance to 1 part by weight of said metal compound, the metal compound being dissolved to the amount of at least about 3 grams to four gallons of water.

7. A process of coating metal which comprises bringing into contact with the metal a solution as claimed in claim 5.

References Cited in the file of this patent

UNITED STATES PATENTS

| | | |
|---|---|---|
| 2,046,061 | Curtin et al. | June 30, 1936 |
| 2,487,007 | Walker et al. | Nov. 1, 1949 |
| 2,502,441 | Dodd et al. | Apr. 4, 1950 |